United States Patent [19]

Kamiguchi et al.

[11] Patent Number: 5,173,223
[45] Date of Patent: Dec. 22, 1992

[54] PRODUCT ACCEPTANCE/REJECTION JUDGMENT METHOD IN AN INJECTION MOLDING MACHINE

[75] Inventors: Masao Kamiguchi; Noriaki Neko, both of Oshino; Kazuo Kubota, Fujiyoshida, all of Japan

[73] Assignee: Fanuc Ltd., Minamitsuru, Japan

[21] Appl. No.: 730,850

[22] PCT Filed: Nov. 14, 1990

[86] PCT No.: PCT/JP90/01479
§ 371 Date: Jul. 12, 1991
§ 102(e) Date: Jul. 12, 1991

[87] PCT Pub. No.: WO91/07268
PCT Pub. Date: May 30, 1991

[30] Foreign Application Priority Data
Nov. 14, 1989 [JP] Japan ............... 1-294035

[51] Int. Cl.$^5$ .............................. B29C 45/76
[52] U.S. Cl. ..................... 264/40.1; 425/135; 425/149; 425/170
[58] Field of Search ........... 264/40.1, 40.5, 328.1; 425/135, 136, 140, 149, 162, 169, 170, 171; 364/476

[56] References Cited

U.S. PATENT DOCUMENTS 4,889,667 12/1989 Kojima et al. ............ 264/40.1
4,911,629 3/1990 Fujita ....................... 264/40.1
4,968,462 11/1990 Hara ......................... 264/40.1
5,017,315 5/1991 Kumazaki ................. 264/40.1

FOREIGN PATENT DOCUMENTS 1-136711 5/1989 Japan.
1-267017 10/1989 Japan.

*Primary Examiner*—Jill L. Heitbrink
*Attorney, Agent, or Firm*—Staas & Halsey

[57] ABSTRACT

A product acceptance/rejection judgment method in an injection molding machine, which makes it possible to properly and quickly set judgment standard parameters and accurately judge whether a product is acceptable or not. Based on injection pressures and screw positions periodically sampled during each of a plurality of injection processes in nondefective product molding, an injection pressure curve group represented as a function of the screw position and an injection pressure curve group represented as a function of the time period elapsed from the start of injection are displayed on two coordinate systems (6, 7) on a display screen. Various reference values (x, p, t) and various upper and lower limit values (pu, pl, tu, tl, xu, xl) defining various permissible ranges for each of the screw positions and elapsed times that have been selected on the coordinate system are set in data display fields (8, 9), taking into account the distribution of the pressure curve groups and displayed contents shown in a data display field (10) and changing with movements of cursors (11, 12). During the execution of an actual molding cycle, each of the actual elapsed time period and actual injection pressure at each of selected screw positions, or each of the actual screw position and actual injection pressures at each of selected elapsed time periods is compared with its permissible range so as to check the acceptance/rejection of the same. Based on the resultant number of rejections, the conformity of a product is determined.

16 Claims, 8 Drawing Sheets

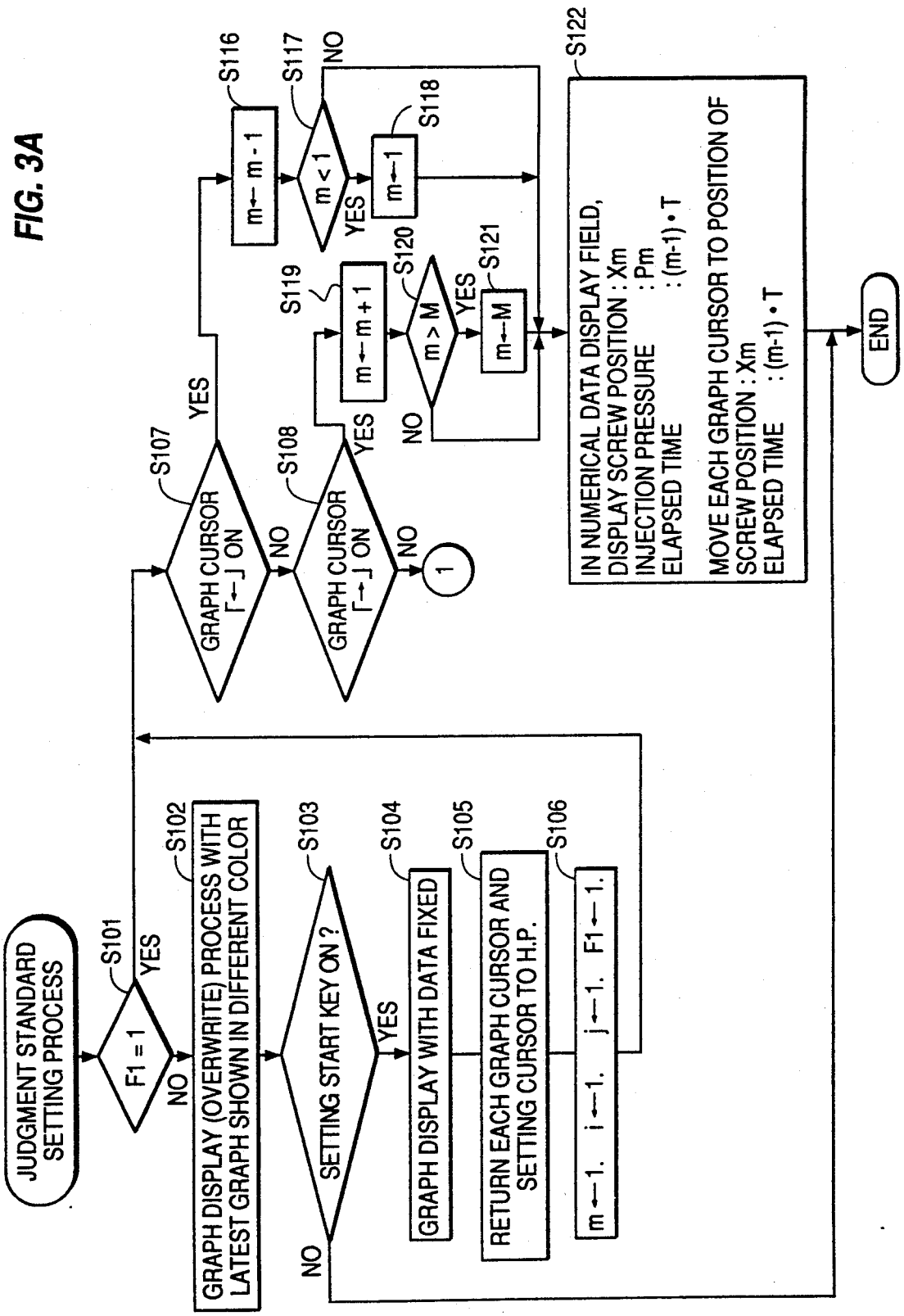

PRODUCT ACCEPTANCE/REJECTION JUDGMENT METHOD IN AN INJECTION MOLDING MACHINE

TECHNICAL FIELD

The present invention relates to a product acceptance/rejection judgment method in an injection molding machine, and more particularly, to a method which makes it possible to properly and quickly set judgment standard parameters and to accurately determine whether a product is acceptable or not.

BACKGROUND ART

With an injection molding machine, products are mass-produced by repeating an injection molding cycle in which molten molding material is injected in a mold, and is cooled under a hold pressure, and is further cooled and solidified. Conventionally, to judge whether mass-produced products are acceptable or not, a product sampled from each product lot is visually compared with a nondefective sample manufactured prior to mass production, thus judging whether the products of each lot are acceptable or not. This judgment method, however, is disadvantageous in that the judgment reliability is low because the acceptance/rejection judgment is made by visual inspection and also because such nondefective samples may be subjected to change on standing. Further, a large space is required to keep many nondefective samples.

The present inventors perceived that the quality of products depends on the changing pattern of the pressure applied to molding material during the injection and hold processes, and proposed and article conformity discriminating apparatus in Japanese Patent Application S63-118357 (International Patent Application PCT/JP90/00396). According to the proposed apparatus, the changing pattern of the reference pressure during a period from the start of injection to the completion of hold is predetermined based on the pressures (reference pressures) which are sampled at regular intervals during the injection and hold processes in nondefective product molding. And an actual pressure change pattern is determined in accordance with the pressures sampled periodically during actual injection and hold processes. Then, it is judged whether differences between the pressures at individual matching points of the two patterns are out of permissible ranges or not, and then it is decided whether the product is acceptable or not according to the number of occurrences of actual pressures that are out of the permissible ranges and are therefore inappropriate.

The present inventors also proposed a product acceptance/rejection judgment system in Japanese Patent Application H1-130064. In the proposed system, for instance, an actual injection pressure is detected at a preset time period elapsed from the start of injection, or actual injection pressures are detected when a screw reaches two preset screw positions after the injection start, respectively. Then, the deviation of each actual pressure from the predetermined pressure is checked whether it falls within a permissible range or not, thus determining whether the product is acceptable or not.

As described above, in these proposals, the actual pressure is detected once or plural times at each detection timing which is determined by an injection control/judgment standard parameter consisting of the elapsed time period from the start of injection or the screw position. The deviation of each actual pressure from its corresponding reference pressure or preset pressure is judged whether it falls within a permissible range or not, then a determination is made as to whether the product is acceptable or not in accordance with the judgment result.

There are some cases, however, that the above two proposals fail to perform accurate acceptance/rejection judgment of products. This is considered primarily because a permissible pressure range (judgment standard parameter) is fixedly set irrespectively of injection control and judgment standard parameter values, despite the fact that the degree of affection of a pressure deviation on the conformity of a product varies with changes in the aforementioned parameter values, i.e., with the progress of injection/hold process. Namely, in the proposed apparatus according to Japanese Patent Application S63-118357, a determination is made as to whether the pressure deviation at each point of a pressure change pattern falls within a fixedly set permissible range. In other words, no consideration is given to the difference between affection degrees of the pressure deviations at various points in the pattern. Nevertheless, the judgment results at the various points in the pressure change pattern are evaluated with the same weight, leading to a possible inappropriate acceptance/rejection judgment of a product. Also in the proposed system of Patent Application H1-130064, which determines whether the deviation between each of the actual pressures detected twice and the corresponding preset pressure falls within the permissible range, normally, all the permissible ranges are set in the same manner. In this proposed system, it appers possible to independently set the respective permissible pressure deviation range in dependence on a parameter value (actual pressure detection timing), so as to eliminate the abovementioned drawback resulting from evaluating all the judgment results with the same weight. However, in practice, an extreme difficulty will be encountered in deciding a preset pressure and a permissible pressure deviation range that are suited for the parameter value, with reference to past molding work data. Similarly, it is also difficult to set the permissible range in dependence on the parameter value in the aforementioned proposed apparatus.

DISCLOSURE OF THE INVENTION

The object of the present invention is to provide a produce acceptance/rejection judgment method in an injection molding machine, which allows judgment standard parameters to be properly and quickly set and which permits accurate acceptance/rejection judgment of products.

To achieve the above-mentioned object, according to one aspect of the present invention, a group of pressure curves is displayed, these curves respectively representing, as a function of a predetermined parameter, changes in pressure during a plurality of injection processes in nondefective product molding. At least one value of the predetermined parameter is selected, and a permissible pressure range corresponding to the selected parameter value is set based on the group of pressure curves. Then, during one actual injection process, a judgment is made as to whether or not an actual pressure generated when the predetermined parameter reaches the parameter value falls within the permissible pressure range, and a determination is made in dependence on results of the judgment as to whether a product is acceptable or not.

Preferably, the predetermined parameter is the position of the screw of an injection molding machine, or a time period elapsed from an instant at which the injection process starts. A plurality of values of the predetermined parameter are selected, and permissible pressure ranges respectively corresponding to the thus selected parameter values are set separately and independently from one another. A judgment is made as to whether or not the actual pressure, generated when the predetermined parameter reaches each parameter value during the actual injection process, falls within the permissible pressure range for that parameter value. Preferably, a counting operation is made each time the actual pressure, generated when the predetermined parameter reaches each parameter value, is determined as falling within the permissible pressure range for that parameter value, or each time the actual pressure is determined as falling outside the permissible pressure range, and a determination is made in dependence on the total count as to whether a product is acceptable or not. The group of pressure curves is displayed on a two-dimensional orthogonal coordinate system provided on a graphic display, and selection and setting of the parameter values and the permissible pressure ranges are made on the graphic display.

According to another aspect of the present invention, first and second groups of pressure curves, which respectively represent, as a function of first and second predetermined parameters, pressure changes during injection processes in nondefective product molding, are separately displayed, and at least one value of one of the first and second predetermined parameters is selected. Further, a permissible pressure range for that parameter value is set in accordance with the pressure curve group represented as the function of one predetermined parameter, while a permissible pressure parameter range for the other predetermined parameter, which range corresponds to the selected parameter value, is set in accordance with the pressure curve group represented as the function of the other predetermined parameter. During one actual injection process, a judgment is made as to whether or not an actual pressure and a value of the other parameter, respectively generated when the one predetermined parameter reaches the selected parameter value, fall within the permissible pressure range and the permissible parameter range, respectively. Then, a determination is made as to whether a product is acceptable or not in accordance with the judgment results.

Preferably, the first and second predetermined parameters are the position of the screw of an injection molding machine and a time period elapsed from the start of an injection process. A plurality of values of one of the predetermined parameters are selected, permissible pressure ranges for these parameter values are set separately and independently from one another, and permissible parameter ranges for the parameter values are set separately and independently. The pressure curves of the first and second groups are respectively displayed on a first and second two-dimensional orthogonal coordinate systems, which are provided independently from each other on a graphic display. The selection of parameter values and setting of permissible pressure ranges and permissible parameter ranges are conducted on the graphic display. Counting is made each time the actual pressure and the value of the other parameter respectively generated when one predetermined parameter reaches each parameter value are respectively determined as falling within the corresponding permissible pressure range and permissible parameter range, or each time they are respectively determined as falling outside the permissible ranges. Whereupon, acceptance or rejection of a product is decided in dependence on the total count.

As described above, according to the present invention, a group of pressure curves, which represents pressure changes during the injection processes in nondefective product molding as a function of a predetermined parameter such as screw position or elapsed time period from the beginning of an injection process, is displayed on, e.g., a graphic display, whereby the overlapping of the pressure curve group during the nondefective product molding, i.e., the distribution of pressure change patterns during the nondefective product molding, can be easily checked. In parallel with such a feature that any point of the pressure curve group can be specified by selecting a parameter value, the above feature makes it possible to allow a permissible pressure range at an arbitrary curve point to be properly and quickly set on, e.g., a graphic display. Thus, acceptance or rejection of a product can be accurately decided based on the permissible pressure range.

Preferably, a plurality of predetermined parameter values are selected, and permissible pressure ranges respectively corresponding to these parameter values are set separately and independently from one another. This makes it possible to appropriately set the permissible pressure ranges in dependence on the degree of influence of pressure deviation to the decision of product acceptance/rejection, which degree varies in dependence on the predetermined parameter values. Thus, it is possible to improve the reliability of each result of a plurality of judgments made during one actual injection process, whereby no inconveniences will be encountered even when all the judgment results are evaluated with the same weight. For this reason, accurate acceptance or rejection can be made even by such a simple method where counting is made each time the actual pressure is determined as falling in its permissible pressure range, and then acceptance or rejection of the product is decided in accordance with the total count.

Also, according to the present invention, first and second groups of pressure curves, respectively representing pressure changes during the nondefective product molding as a function of first and second predetermined parameters, are displayed independently from each other; and the permissible pressure range corresponding to a value selected for one parameter is set in accordance with the pressure curve group represented as the function of one predetermined parameter, whereas the permissible pressure range, corresponding to that selected parameter value, for the other predetermined parameter is set in accordance with the pressure curve group represented as the function of the other predetermined parameter; and further a judgment is made as to whether or not the actual pressure and the value of the other parameter, generated when one predetermined parameter reaches the selected parameter value during one actual injection process, fall within the permissible pressure range and the permissible parameter range, respectively. Accordingly, the conformity of the actual pressure can be decided, and at the same time, the conformity of the required parameter values in the actual injection process can be also decided, whereby a more accurate product acceptance/rejection judgment can be achieved by totally evaluating both the decision results.

BRIEF DESCRIPTION OF THE DRAWINGS

FIGS. 3A-3D are flowcharts showing an embodiment of a judgment standard setting process executed by a numerical control apparatus shown in FIG. 1.

BEST MODE OF CARRYING OUT OF THE INVENTION

Figure 1:
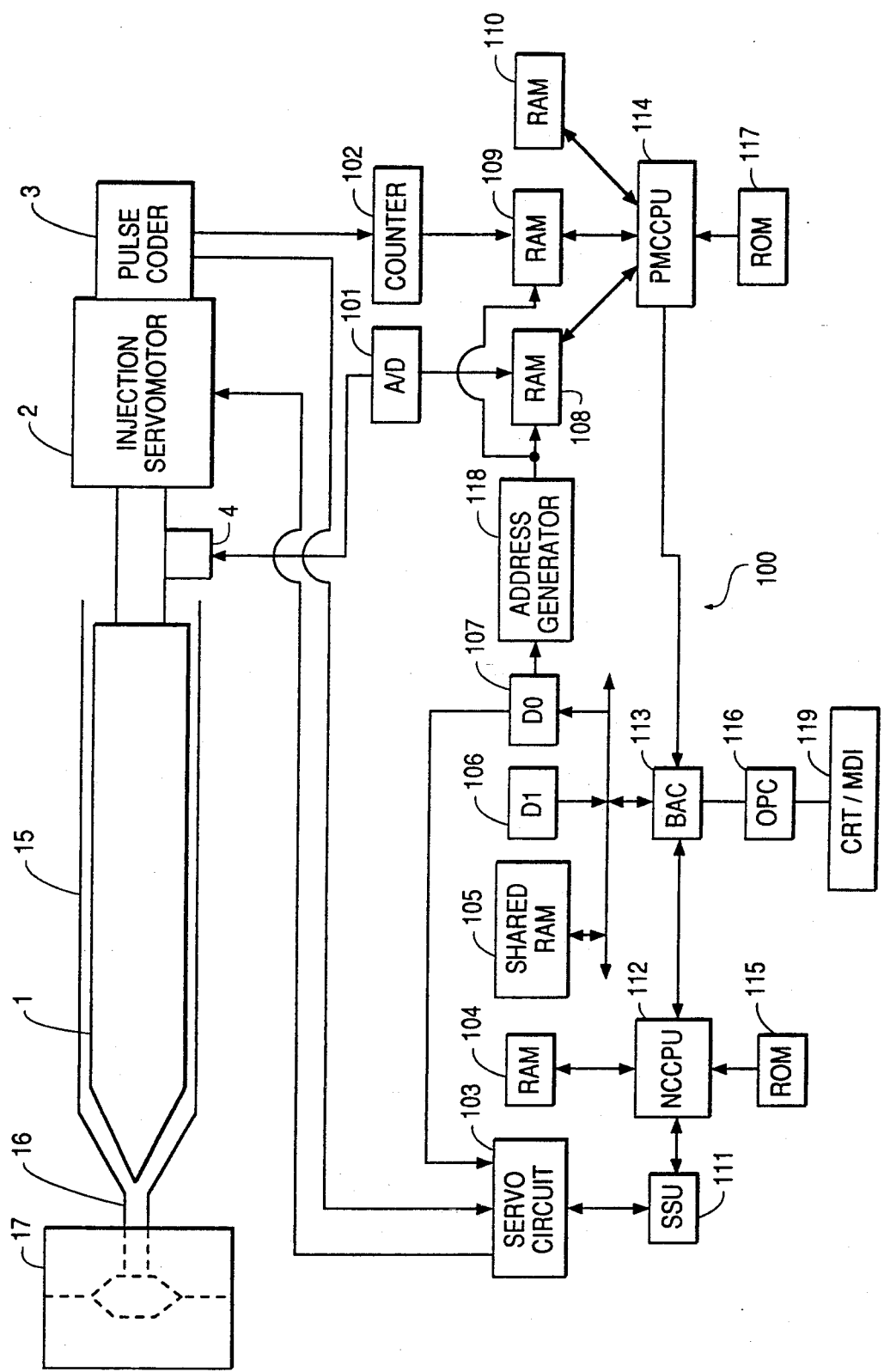
FIG. 1 is a block diagram showing an essential part of an injection molding machine for embodying a product acceptance/rejection judgment method according to an embodiment of the present invention.

An electric injection molding machine for embodying a product acceptance/rejection judgment method of the present invention comprises various units such as injection unit, mold clamping unit, and product ejecting unit (ejector). Referring to FIG. 1, the injection unit, which is provided with a screw 1 disposed in a heating cylinder 15, an injection servomotor 2 for axially driving the screw, and a servomotor (not shown) for rotating the screw 1, is designed to axially move the screw 1 to thereby inject molding material (resin), plasticized and kneaded within the heating cylinder 15, into a mold 17 through a nozzle 16. The injection servomotor 2 is mounted with a pulse coder 3 for detecting the rotary position of the motor (axially moved position of the screw), and the screw 1 is mounted with a pressure sensor 4 for detecting a resin pressure (axial reaction force applied by the molten resin to the screw). The injection molding machine is also provided with a numerical control apparatus (hereinafter referred to as NC apparatus) 100 arranged to cooperate with a programmable machine controller (mentioned later) to control the various units of the injection molding machine.

The NC apparatus 100 comprises a microprocessor (hereinafter referred to as NCCPU) 112 for numerical control for controlling various servomotors through a servo interface 111 and various servo circuits (only the pulse coder and the servo circuit for the injection servomotor 2 are respectively shown by numerals 3 and 103) connected to pulse coders. Connected to the NCCPU 112 are a random-access memory (RAM) 104 for temporal data storage, etc., and a read-only memory (ROM) 115 storing therein a management program for controlling the whole of the injection molding machine.

Further, the NC apparatus 100 comprises a microprocessor (hereinafter referred to as PMCCPU) 114 for the programmable machine controller, to which connected are a RAM 110 for temporal data storage, etc., and a ROM 117 storing therein, e.g., a sequence program for controlling a sequencial operation of the injection molding machine. The PMCCPU 114 includes various flag memories, registers and counters (not illustrated) for the later-mentioned judgment standard setting and product acceptance/rejection judgment processes.

Interposed between the CPUs 112 and 114 is a bus arbiter controller (hereinafter referred to as BAC) 113 to which the buses of a shared memory 105, an input circuit 106, and an output circuit 107 are connected. Under the control of the BAC 113, either one of the CPUs 112 and 114 is allowed to selectively get access to a required one of elements 105 to 107 in each arithmetic operation cycle of these CPUs. The shared memory 105 consisting of a nonvolatile RAM has a program storage section for storing therein, e.g., an NC program for controlling the injection molding machine, and a setting section for storing therein various setting values, parameters and macro variables, by which molding conditions are represented.

The input circuit 106 is connected to various sensors, etc., provided in the various units of the injection molding machine, and the output circuit 107 is connected to various servo circuits including the servo circuit 103, and an address generator 118 connected to two RAMs 108 and 109 which are accessible from the PMCCPU 114. The RAM 108, which is connected to an A/D converter 101 connected to the pressure sensor 4, is designed to store an output, indicative of a resin pressure, of the A/D converter in an address region thereof specified by an output signal supplied from the address generator 118. The RAM 109, connected to a counter 102 for adding up feedback pulses received from the pulse coder 3, is designed to store a counter output, indicative of a screw position, in an address region thereof specified by the address generator output.

A manual data input device with a CRT display unit (hereinafter referred to as CRT/MDI) 119, connected to the BAC 113 through an operator panel controller 116, comprises a CRT display controller, and various keys, such as software keys and ten-key, for entry of various data and for display of various setting screens. The CRT display controller accommodates therein RAMs for pressure data, which are, e.g., three in number and each of which corresponds to the RAM 108, and RAMs for screw position data, which are, e.g., three in number and each of which corresponds to the RAM 109. Further, the software keys are designed such that each software key is assigned with a function determined in dependence on its operation mode, to thereby provide more functions than the number of the software keys installed.

In the following, the operation of the injection molding machine constructed as mentioned above will be explained.

Before start of actual injection molding cycles for mass production of molded products, an injection molding cycle is executed to set judgment standard parameters used for a determination of product conformity in the actual molding cycles. To this end, when an operator operates the CRT/MDI 119 to enter molding conditions determined in accordance with the type of product (mold) after the mold 17 is mounted to the injection molding machine, the molding conditions thus entered are stored in the setting section of the shared RAM 105. Thereafter, in accordance with a sequence program stored in the ROM 117 and an NC program and molding conditions stored in the shared RAM 105, sequential control is conducted by the PMCCPU 114, and at the same time, servomotors for the individual axes are drivingly controlled by the NCCPU 112, so that the injection molding cycle is repetitively carried out. If required, the molding conditions will be changed.

During the injection molding cycles, an analog output, indicative of the resin pressure applied to the screw 1, of the pressure sensor 4 is converted into a digital signal in the A/D converter 101. Also, feedback pulses delivered from the pulse coder 3 as the screw 1 moves are added up at the counter 102. This integrated value indicates the position of the screw. When reading an injection start command from the program, the PMCCPU 114 causes the address generator 118 to operate. Namely, upon start of the injection process, the address generator 118 starts the delivery of an address specifying output (sampling command) to the RAMs 108 and 109. The address specifying output is updated at intervals of a sampling period $\tau$. As a result, an injection pressure and screw position in each sampling cycle are stored in corresponding address regions of the RAMs 108 and 109.

TABLE 1

(Sampling Data)

| Address | Elapsed time (T) | Screw Position (X) | Injection pressure (P) |
| --- | --- | --- | --- |
| 1 | 0 | X1 | P1 |
| 2 | $\tau$ | X2 | P2 |
| 3 | $2 \cdot \tau$ | X3 | P3 |
| . | . | . | . |
| . | . | . | . |
| . | . | . | . |
| m | $(m-1) \cdot \tau$ | Xm | Pm |
| . | . | . | . |
| . | . | . | . |
| M | $(M-1) \cdot \tau$ | XM | PM |

The aforementioned sampling operation is repeated during a time period which begins at start of the injection process and which ends at completion of the hold process. As shown in Table 1, the injection and hold pressures (hereinafter referred to as injection pressures) Pm and the screw positions Xm in one injection molding cycle are stored in the same address region m (=1, 2, ..., M) of the RAMs 108 and 109 in time series, respectively. In the meantime, since the first sampling is conducted at the injection start, a time period Tm elapsed from the injection start, which corresponds to the common address region m, can be expressed by a formula of $Tm=(m-1)\cdot\tau$.

Figure 2:
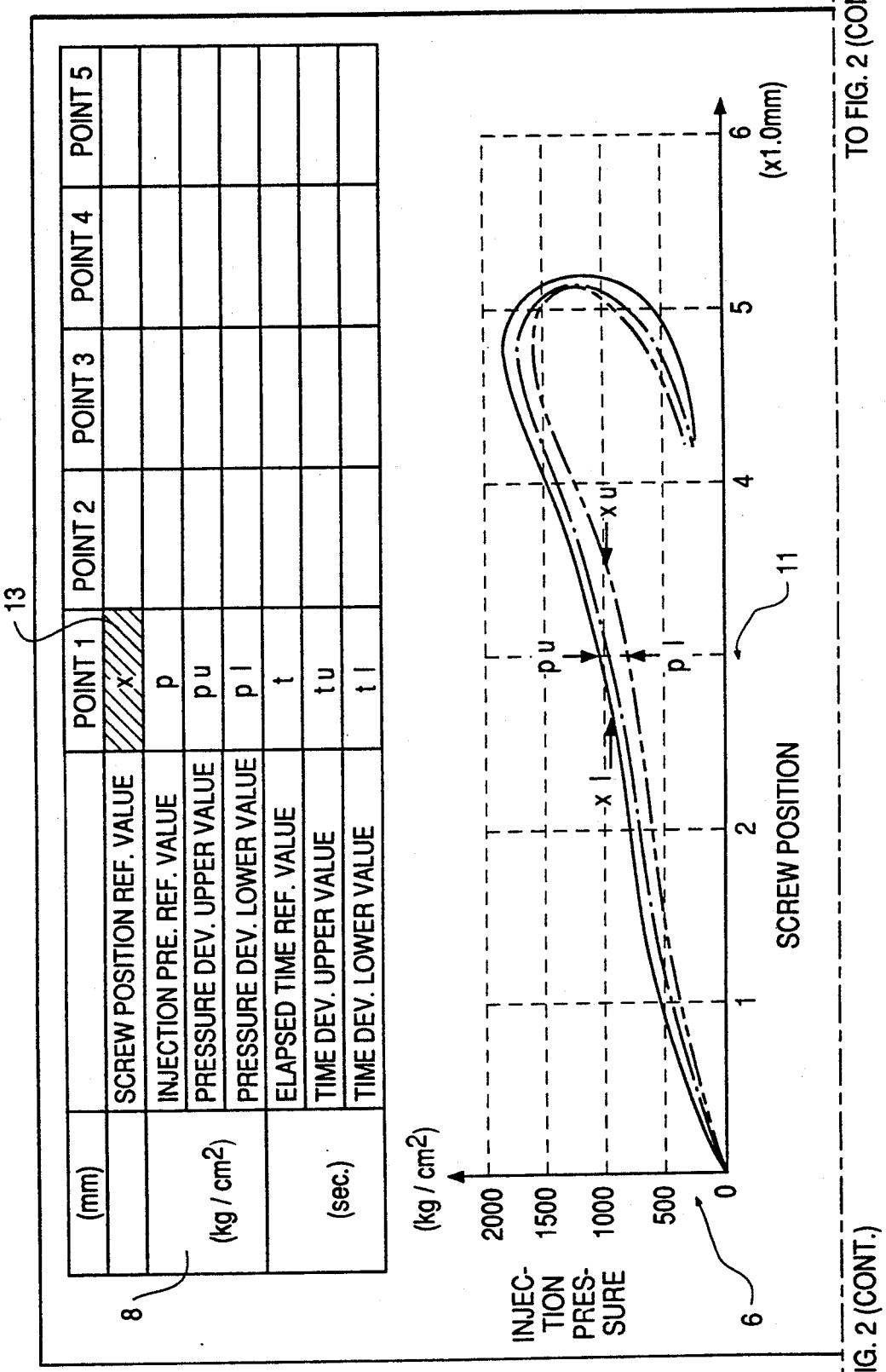
FIG. 2 is a view showing, by way of example, a setting screen displayed by a data input device shown in FIG. 1.
Figure 2:
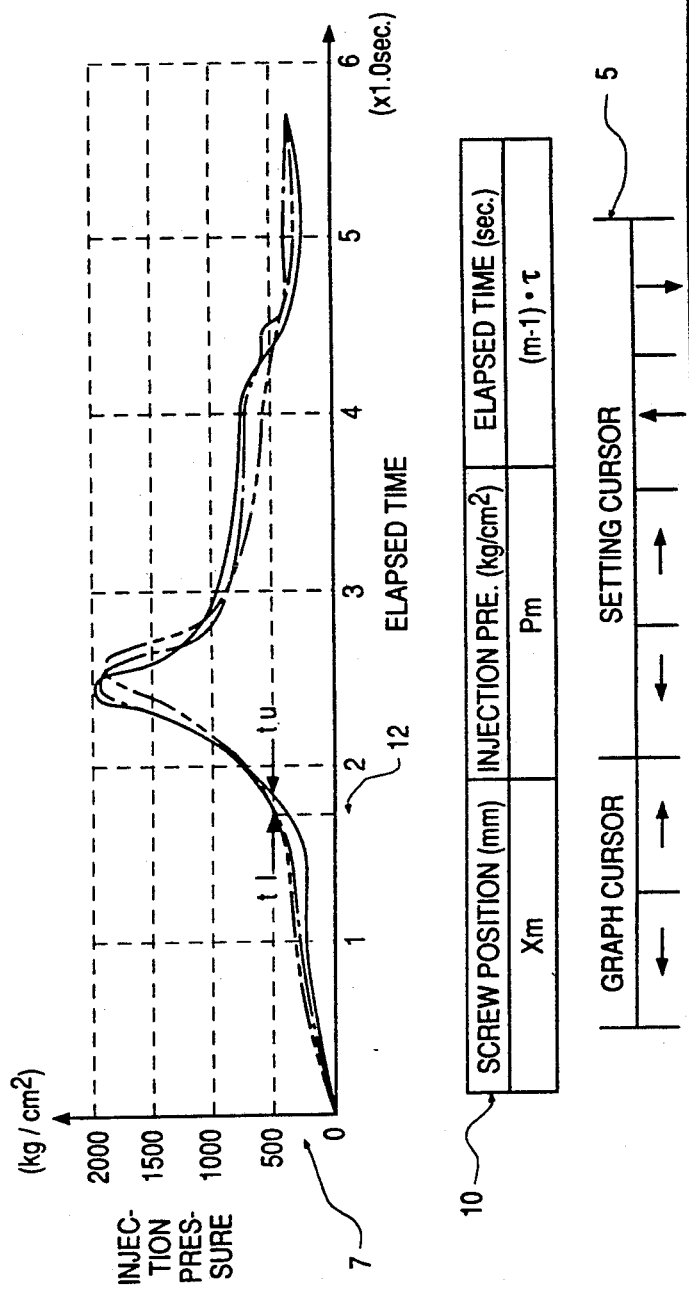
Figure 3B:
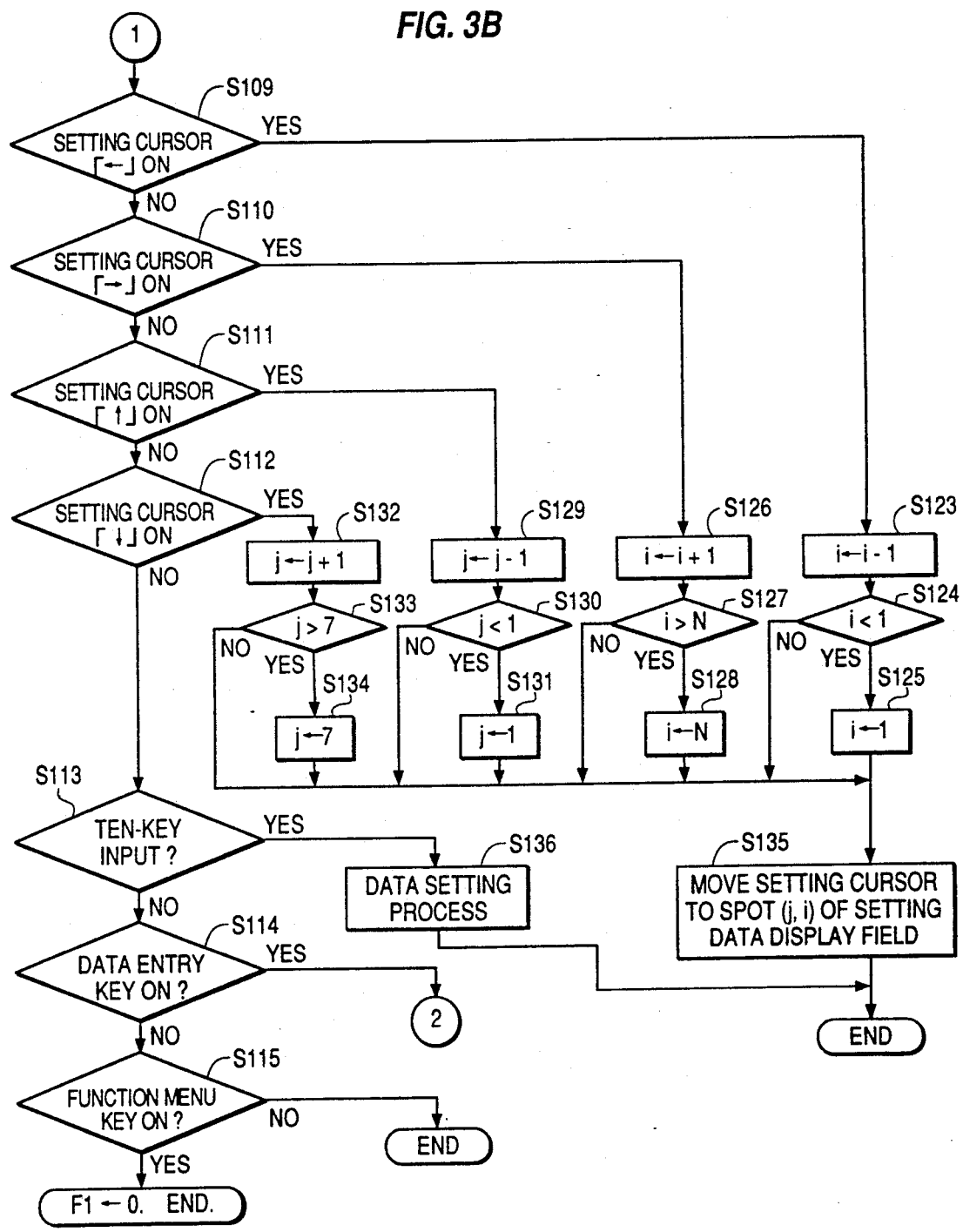
Figure 3C:
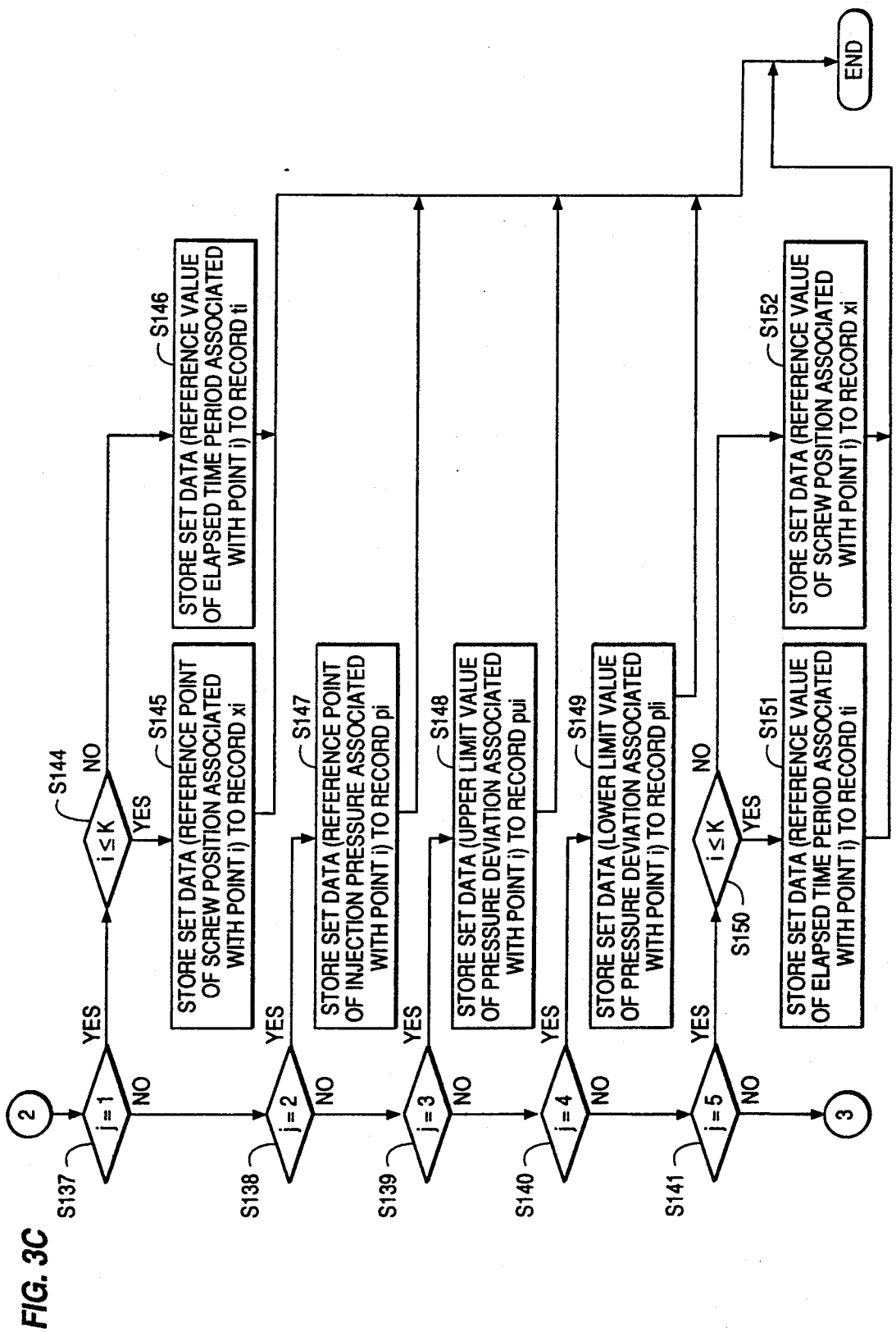
Figure 3D:
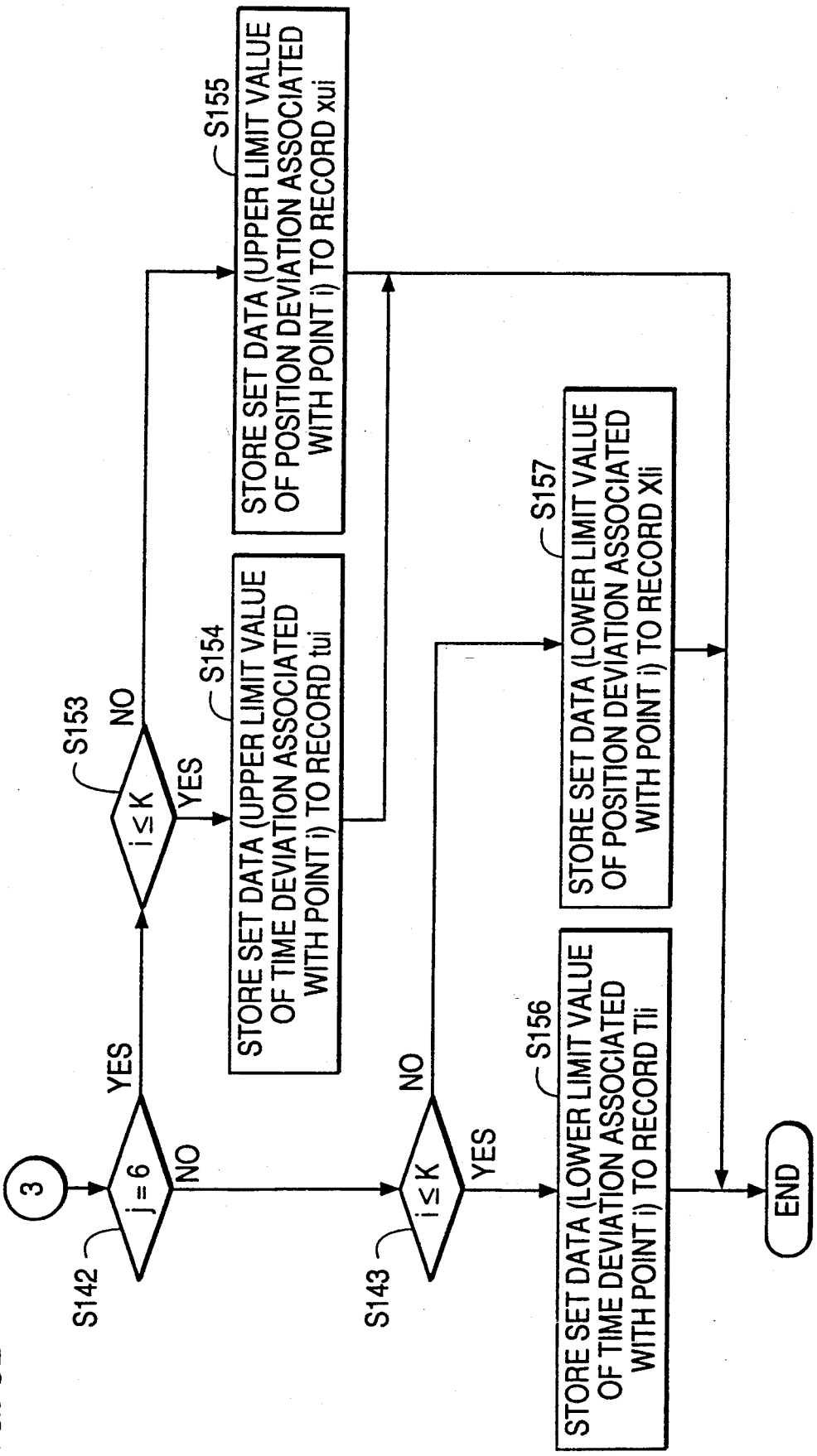

Subsequently, when the operator depresses a function menu key (not shown) of the CRT/MDI 119, the PMCCPU 114 starts the judgment standard setting process shown in FIG. 3. This setting process is periodically executed. In each process cycle, the CPU 114 judges whether or not a flag F1 is set to "1" which indicates that the judgment standard setting process is being executed (step S101). The flag F1 is set to "1" in response to operator's operation of a setting start key (mentioned later), and the judgment result in step S101 immediately after the judgment standard setting process is initiated will be negative. In this case, under the control of the PMCCPU 114, the setting screen shown in FIG. 2 is displayed on the CRT screen of the CRT/MDI 119. Also, the functions of a left movement key and right movement key for a first graph cursor 11, the left movement key and right movement key for a second graph cursor 12, and the left movement key, right movement key, upward movement key and downward movement key for a setting cursor key 13 are allotted to predetermined software keys of the CRT/MDI 119 (step 102), respectively.

More specifically, displayed on the setting screen are a first set data display field 8, first coordinate system 6, second set data display field 9, second coordinate system 7, numerical data field 10, and cursor guidance 5. The first set data display field 8 is provided with fields (spots) of 7 rows×5 columns for respectively displaying reference values of the screw position, injection pressure, and time period elapsed from injection start, and upper and lower limit values of pressure deviation and elapsed time period for each of the latter-mentioned five judgment points (point 1 to point 5). The second set data display field 9 consists of fields of 7 rows×5 columns for displaying reference values of the screw position, injection pressure and elapsed time period, and upper and lower limit values of pressure deviation and position deviation for each of other five judgment points. Each of the coordinate systems 6 and 7 is a two-dimensional orthogonal coordinate system. In the first coordinate system 6, the injection pressure and the screw position are taken along the ordinate and abscissa thereof, respectively. In the second coordinate system 7, the injection pressure and the elapsed time period from injection start are respectively taken along its ordinate and abscissa. The numerical data field 10 is provided with fields for displaying numerical values of screw position, injection pressure and elapsed time period.

Next, on the basis of sampled data already transferred from the RAM 108 for pressure data and the RAM 109 for screw position data to the RAM built in the CRT display controller of the CRT/MDI 119, a first group of pressure curves which represents the relationship between the screw position and the injection pressure in each of the latest three injection processes, and a second group of pressure curves which represents the relationship between the elapsed time period from injection start and the injection pressure are respectively displayed in the first and second coordinate systems 6 and 7 (step S102). Preferably, the pressure curve for the latest injection process is displayed in a different color from those for other injection processes. In FIG. 2, the pressure curve of the latest injection process is shown by one dot chain line, and other pressure curves are shown by solid line and two-dot chain line.

Then, the PMCCPU 114 determines whether the setting start key (not shown) of the CRT/MDI 119 has been operated or not (step S103). If the setting start key has not been operated, then the CPU114 terminates the "judgment standard setting process" for the present cycle, and waits for the setting start key to be operated. Thereafter, the injection molding cycle is continued, with the molding conditions changed where required. During this time, pressure curves are displayed as described above as steps S101 to S103 are carried out.

The operator judges whether a nondefective product has been molded or not. To make such a judgment, the operator observes the overlapping (distribution) of the pressure curves of the first group and the overlapping of the pressure curves of the second group. If the pressure curves of each group come closer and the latest pressure curve lies between the other two pressure curves, then the operator decides that a nondefective product has been molded, and operates the setting start key.

When the PMCCPU 114 determines that the setting start key has been operated in step S103, it prohibits updating of the pressure data and screw position data on three injection processes stored in the CRT display controller at the time point of that judgment. This causes the first and second pressure curve groups on the three injection processes obtained immediately before the setting start key operation to be continuously displayed on the first and second coordinate systems 6 and 7 (step S104).

Then, the PMCCPU 114 moves the first and second graphic cursors 11 and 12 back to their home positions on the first and second coordinate system, and also moves the setting cursor 13 to its home position on the first set data display field 8 (step S105). The PMCCPU 114 sets a retrieval index m, indicative of the common address of the pressure data RAM and the screw position data RAM respectively provided in the CRT display controller, a retrieval index j, indicative of the respective rows of the first and second set data fields 8 and 9, and a retrieval index i, indicative of the respective columns of these set data fields, to their initial values of "1", respectively. Also, the PMCCPU sets the flag F1 to a value of "1" indicating that the setting process is being conducted (step S106). In steps S107 to S115 following step S106, the PMCCPU makes a search for the operation states of various keys, and if it is found that no key has been operated, then it waits for a key operation.

As described in detail later, the operator successively selects screw positions and/or elapsed time periods from injection start, which are suited as judgment points (parameters which specify required actual values of injection process parameters to be evaluated for product conformity judgment), and then enters judgment standard data for carrying out the above-mentioned evaluation in the respective fields (spots) of the first and second set data display fields 8 and 9. To select the judgment points and enter judgment standard data, the operator operates the movement keys for the first and second graph cursors 11 and 12, so as to move these cursors 11 and 12 along the abscissas of the first and second coordinate systems, and at the same time, refers to contents displayed on the numerical data field 10, which are updated as the cursors are moved. Also, the operator operates the movement keys for the setting cursor 13 to move the same to spots in the first and second set data fields where data are to be set, then sets the data through the ten-key pad, and operates the data entry key to cause the set data to be stored in the shared RAM 105.

In the following, the operation of the PMCCPU 114 when various cursor movement keys are operated.

When the CPU 114 detects that the key for moving the graph cursor to the left has been operated (step S107), the CPU decrements the value of the retrieval index m (step S116), and if the retrieval index m becomes a value less than "1", then the CPU sets the value of the index m to "1" again (steps S117 and S118). If the CPU 114 detects at step S108 that the key for moving the graph cursor to the right has been operated, it increments the value of the retrieval index m (step S119). And if the value of the retrieval index m exceeds a final address M, then the CPU sets the value of the index m to M again (steps S120 and S121). Accordingly, the value of the index m is limited to a range varying from 1 to M. Under the control of the PMCCPU 114 and in accordance with the value of the retrieval index m, the screw position Xm and its corresponding injection pressure Pm of the latest injection process are read from the common address region m, associated with the latest injection process, of the pressure data RAM and the screw position data RAM each provided in the CRT display controller, and the elapsed time period $(m-1)\cdot\tau$ is calculated. Then, the screw position Xm, injection pressure Pm and elapsed time period $(m-1)\cdot\tau$ are displayed in the numerical data field 10. Further, the first graph cursor 11 is moved to that position which represents the screw position Xm on the abscissa of the first coordinate system 6, and the second graph cursor 12 is moved to that position which represents the elapsed time period $(m-1)\cdot\tau$ on the abscissa of the second coordinate system 7 (step S122).

When the PMCCPU 114 detects that the key for moving the setting cursor to the left has been operated (step S109), it decrements the value of the retrieval index i (step S123), and if the retrieval index i becomes a value less than "1", then the PMCCPU sets the value of the index i to "1" again (steps S124 and S125). When the operator operates the key for moving the setting cursor to the right, the CPU 114 detects this (step S110), and increments the value of the retrieval index i (step S126). And if the value of retrieval index i exceeds the value of total number N of the judgment points, then the value of the index i is set to N again (steps S127 and S128). Accordingly, the value of the index i is limited to a range from 1 to N. Further, when the operator operates the key for moving the setting cursor upward, the CPU 114 detects this (step S111), and decrements the value of the retrieval index j (step S129). And, if the retrieval index i has a value less than "1", then the value of the index j is reset to "1" (steps S130 and S131). When the PMCCPU 114 detects that the key for moving the setting cursor downward has been operated (step S112), it increments the value of the retrieval index j (step S132), and if the value of the retrieval index j exceeds the value of the final row "7", then the PMCCPU resets the value of the retrieval index j to "7" (steps S133 and S134). Accordingly, the value of the index j is limited to the range from 1 to 7.

The PMCCPU 114 moves the setting cursor 13 to the spot at row j and column i in the first and second set data display fields 8 and 9 in accordance with the retrieval indexes j and i (step S135). The total number N of the judgment points is equal to the sum of the number K of the judgment points associated with the screw position and the number K' of the judgment points associated with the elapsed time period. Each of the numbers K and K' of the judgment points (each of them is set to 5 in the present embodiment) may be set in an arbitrarily manner. Both the data fields 8 and 9 are displayed on the setting screen independently from each other, however, they are handled as a single horizontal row in software processing.

Next, explanations as to selection of the judgment points and entry of numerical values to the spots of the set data fields will be given.

The data to be set in the first set data field 8 are a reference value x of the screw position, a reference value p of the injection pressure, an upper limit value pu of the pressure deviation, a lower limit value pl of the pressure deviation, a reference value t of the elapsed time period, an upper limit value tu of the time period deviation, and a lower limit value tl of the time period deviation for each of the first to fifth judgment points. Normally, the operator sets the reference values x, p and t in accordance with two pressure curves associated with the latest injection process at the moment the setting key is operated.

To select the first judgment point, the operator observes the distribution of the pressure curve group displayed on the first coordinate system 6, and then operates cursor movement keys so as to move the first graph cursor 11 onto, e.g., that screw position which specifies one curve portion by which the latest pressure curve is characterized, to thereby select this screw position as the first judgment point. In accordance with the retrieval index m which is updated as the cursor moves, the screw position Xm, and the injection pressure Pm and the elapsed time period $(m-1)\cdot\tau$, respectively corresponding to the screw position in the latest one injection process, are displayed in the numerical value data field 10, as mentioned above.

Next, to set the reference value x of the screw position of the first judgment point, the operator moves the setting cursor 13 onto the spot at the first row and first column in the first set data field 8, and then enters data equal to the displayed screw position Xm through the ten-key pad. The PMCCPU 114, when it determines the input through the ten-key pad (step S113), reads the thus entered numerical data one after another as a single string of numerical values (step S136). After that, when the operator operates the data entry key (step S114), these numerical values of one string are stored, as the reference value x of the screw position associated with the first judgment point, into a record x1 of storage means (hereinafter referred to as files), which are in the form of files as shown in Tables 2 and 3, in accordance with the values of indexes j and i (steps S137, S144 and S145).

Then, the operator moves the setting cursor 13 to the first column of the second row in the first set data field 8, and enters, using the ten-key pad, the injection pressure Pm shown in the numerical data field 10 as the injection pressure reference value p associated with the first judgment point. The operator also moves the cursor 13 to the first column of the fifth row in the display field 8, and enters, using the ten-key pad, the elapsed time period $(m-1)\cdot\tau$ displayed in the display field 10 as the reference value t of the time period deviation.

TABLE 2

| Judgment Standard in Relationship between Screw Position and Injection Pressure | | | | | | | |
|---|---|---|---|---|---|---|---|
| Judgment point No. | Screw position (X) | Elapsed time (t) | Time deviation High (tu) | Time deviation Low (tl) | Injection pressure (p) | Pressure deviation High (pu) | Pressure deviation Low (pl) |
| 1 | x 1 | t 1 | tu1 | tl1 | p 1 | pu1 | pl1 |
| 2 | x 2 | t 2 | tu2 | tl2 | p 2 | pu2 | pl2 |
| 3 | x 3 | t 3 | tu3 | tl3 | p 3 | pu3 | pl3 |
| . | . | . | . | . | . | . | . |
| . | . | . | . | . | . | . | . |
| . | . | . | . | . | . | . | . |
| K | x k | t k | tuk | tlk | p k | puk | plk |

With reference to the distribution of the pressure curves on the first coordinate system 6, the operator determines the upper limit value pu and the lower limit value pl of the pressure deviation, which values define the limitation of actual pressure variations in the positive and negative directions on the ordinate axis with respect to the reference pressure on the latest pressure curve. At this time, the operator may move the first cursor 11 to that screw position at which a pressure equal to the upper limit pressure obtained at the screw position Xm is given on the latest pressure curve, read the injection output indicated in the numerical data field 10 at that time as the upper limit pressure, and then determine the upper limit value pu from that upper limit pressure and the reference pressure p. Alternatively, the upper value pu may be determined with reference to the scale of the ordinate axis of the first coordinate system 6. Next, the lower limit value pl of the pressure deviation is decided in the same manner. Then, the setting cursor 13 is moved to the first column of the third row in the display field 8 to enter the upper limit value pu through the ten-key pad, and the cursor is moved to the spot at the first column of the fourth row to enter the lower limit value pl through the ten-key pad.

Further, with reference to the distribution of the pressure curves on the second coordinate system 7, the operator decides the upper limit value tu and lower limit value tl of the time period deviation, which define the limitation of actual elapsed time period variations in the positive and negative directions on the abscissa axis with respect to the reference elapsed time period on the latest pressure curve. When deciding the upper and lower limit values, the operator can refer to the elapsed time period shown in the numerical data field 10 while moving the second cursor 12. Whereupon, the setting cursor 13 is moved to the first column of the sixth row of the display field 8 to enter the upper limit value tu, using the ten-key pad, and then the cursor is moved to the spot at the first column of the seventh row to enter the lower limit value tl in that spot, using the ten-key pad.

Each of the injection pressure reference value p through the lower limit value tl of the time period deviation with respect to the first judgment point is entered through the ten-key pad, and is then read by the PMCCPU 114 (steps S113 and S136). After that, when the data entry key is operated (step S114), under the control of the PMCCPU 114, the reference value p of the injection pressure is stored in a record pl (steps S138 and S147), the upper limit value pu of the pressure deviation in a record pu1 (steps S139 and S148), and the lower limit value pl of the pressure deviation in a record pl1 (steps S140 and S149) in accordance with the values of indexes j and i which correspond to the position of the setting cursor 13. Similarly, the reference value t of the elapsed time period is stored in a record tl (steps S141, S150, S151), the upper limit value tu of time period deviation in a record tu1 (steps S142, S153 and S154), and the lower limit value tl of the time period deviation in a record tl1 (steps S143 and S156).

TABLE 3

| Judgment Standard in Relationship between Injection Time and Elapsed Time Period | | | | | | | |
|---|---|---|---|---|---|---|---|
| Judgment point No. | Elapsed time (t) | Screw position (X) | Position deviation High (tu) | Position deviation Low (tl) | Injection pressure (p) | Pressure deviation High (pu) | Pressure deviation Low (pl) |
| K + 1 | tk + 1 | Xk + 1 | tuk + 1 | tlk + 1 | pk + 1 | puk + 1 | plk + 1 |
| K + 2 | tk + 2 | Xk + 2 | tuk + 2 | tlk + 2 | pk + 2 | puk + 2 | plk + 2 |
| K + 3 | tk + 3 | Xk + 3 | tuk + 3 | tlk + 3 | pk + 3 | puk + 3 | plk + 3 |
| . | . | . | . | . | . | . | . |
| . | . | . | . | . | . | . | . |
| . | . | . | . | . | . | . | . |

TABLE 3-continued

| Judgment point No. | Elapsed time (t) | Screw position (X) | Position deviation | | Injection pressure (p) | Pressure deviation | |
|---|---|---|---|---|---|---|---|
| | | | High (tu) | Low (tl) | | High (pu) | Low (pl) |
| N | tN | xN | tuN | tlN | pN | puN | plN |

Next, the operator successively selects screw positions that are suited for the second to K-th (=5) judgment points. The reference values of the screw position, injection pressure and elapsed time period, and the upper and lower limit values of the pressure deviation and time period deviation for each judgment point are set in the same manner as with the first judgment point. These set values are stored in those records of the file, corresponding to column i of the first set data display field 8, which are associated with a corresponding one of the judgment points (See Table 2).

In the present embodiment, in addition to the first to K-th (=5) judgment points associated with the screw positions, five more judgment points, i.e., from the (K+1)-th to N-th judgment points, which are associated with elapsed time periods from the moment injection is started are arbitrarily selected. To this end, with reference to the second pressure curve group which indicates the relationship between the elapsed time period and the injection pressure and which is written in a manner superimposed on the second coordinate system 7, the operator so operates cursor movement keys as to move the second graph cursor 12 laterally, thereby sequentially selecting those elapsed time periods which are suitable as judgment objects (steps S107 and S108). Whereupon, the reference value t of the elapsed time period, the reference value p of the injection pressure, and the reverence value x of the screw position at each judgment point are set in the second set data display field 9 (step S122), with reference to the distribution of the pressure curves of the second group as well as the elapsed time period (m−1)·τ, the injection pressure Pm and the screw position Xm which are displayed in the numerical data field 10. Normally, the judgment points are selected on the basis of the latest pressure curve among the second pressure curve group. Therefore, an arbitrary elapsed time period (m−1)·τ, a corresponding injection pressure Pm and a corresponding screw position Xm during the latest single injection process are set as the aforementioned three reference values.

On the basis of the first pressure curve group displayed in the first coordinate system 6, the operator further sets the upper limit value pu and lower limit value pl of the pressure deviation, which define the limitation of actual pressure variations in the positive and negative directions on the ordinate axis with respect to the reference pressure on the latest pressure curve, and also sets the upper limit value xu and the lower limit value xl of the position deviation, which define the limitation of actual screw position variations in the positive and negative directions on the abscissa axis with respect to the reference screw position on the latest pressure curve.

In the same manner as with the judgment points associated with the screw position, the operator moves the setting cursor 13 to one of the spots (j=1 to 7, i=K+1 to N) in the set data display field 9 (steps S109 to S112), and then enters through the ten-key pad the reference values of the elapsed time period, injection pressure and screw position, and the upper and lower limit values of the pressure deviation and position deviation for one of the (K+1)-th to the N-th judgment points (step S113). The numeral data entered through the ten-key pad is read by the PMCCPU 114 (S136), and is stored in records of a file corresponding to that judgment point which is associated with the data thus read (steps S114, S137, S144, S146, etc.). This procedure is repeated for all the spots in the display field 9, so that all the numerical data for the (K+1)-th to N-th judgment points are stored in the files concerned (steps S146 to S149, S152, S155 and S157).

In the above manner, the reference values x, p and t of screw position, injection pressure and elapsed time period, the upper and lower limit values pu and pl of the pressure deviation, and the upper and lower limit values of the time period deviation tu and tl for each of the first to K-th judgment points respectively associated with the screw position are set and stored in the files of the shared RAM 105 (see Table 2). Similarly, the reference values t, p and x of the elapsed time period, injection pressure and screw position, the upper and lower limit values pu and pl of the pressure deviation, and the upper and lower limit values xu and xl of the position deviation for each of the (K+1)-th to N-th judgment points associated with the time period elapsed from injection start are also set and stored in the files of the shared RAM 105 (see Table 3). Thus, permissible ranges of the judgment standard parameters (injection pressure, elapsed time period after the start of injection, and screw position) for the respective judgment points are set arbitrarily and independently from one another. As a result, the reliability of the individual judgment standard data can be improved, so that it is possible to evaluate judgment results for the respective judgment points, with the same weight, in determining the product conformity.

When all the judgment standard data has been set in the foregoing manner, the operator turns off the function menu key. When the PMCCPU 114 detects this at step S115, the PMCCPU resets the flag F1 to a value of "1" indicating that the judgment standard setting process is no longer being executed. Whereupon, the processing shown in FIG. 3 is completed.

In the following, the acceptance/rejection judgment process will be explained with reference to FIG. 4.

Figure 4:
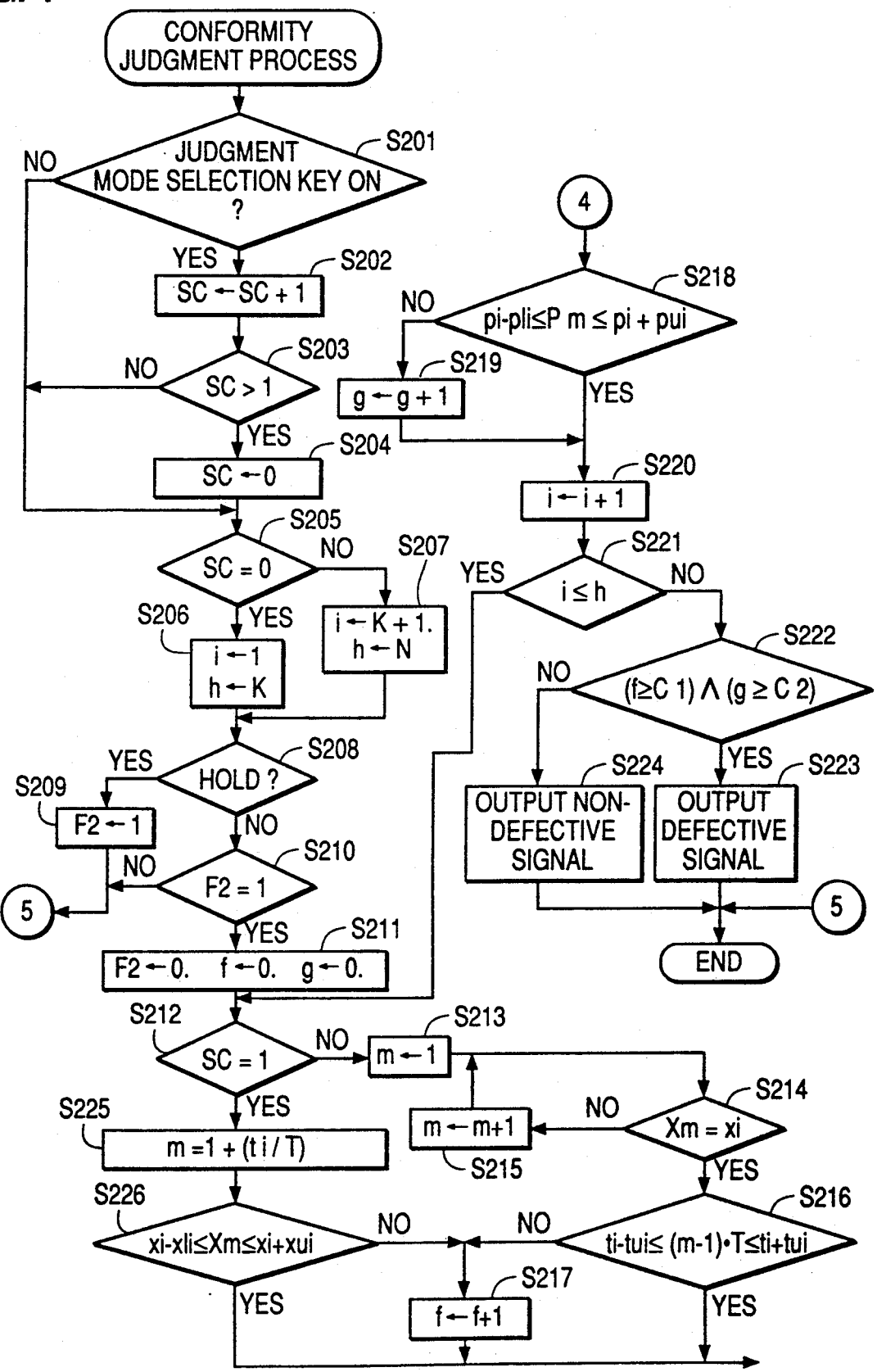
FIG. 4 is a flowchart showing an embodiment of a product acceptance/rejection judgment process executed by the numerical control apparatus.

When the operator operates an acceptance/rejection judgment key (not illustrated) after an injection molding cycle is started, the PMCCPU 114 initiates the conformity judgment process of FIG. 4 which will be periodically executed thereafter. In each processing period, the CPU 114 determines whether or not the operator has operated a judgment mode selector key, not shown (step S201). This judgment mode selector key is used to select either one of a first judgment mode where a conformity judgment is conducted on the basis of the first to K-th judgment points associated with screw positions, and a second judgment mode where the conformity judgment is made based on the (K+1)-th to N-th judgment points associated with elapsed time periods from the start of injection.

When the PMCCPU 114 determines at step S201 that the judgment mode selector key has been pressed, it increments a value SC in a built-in counter (step S202), and then determines whether the updated counter value SC exceeds "1" or not (step S203). If it is determined that the counter value SC exceeds "1," then the PMCCPU resets the counter value to "0" (step S204). The counter value SC remains unchanged unless the judgment mode selector key is operated, and is switched between "0" and "1" each time the key is operated.

Next, the CPU 114 determines, according to the current counter value SC, whether the conformity judgment should be made in either one of the first and second judgment modes (step S205). If the counter value SC is "0," then the CPU 114 decides to execute judgment in the first judgment mode, and sets the retrieval index i to "1" and a retrieval end value h to "K (=5)" (step S206). If the counter value SC is other than "0", then the CPU 114 decides to execute the judgment in the second judgment mode, and sets the retrieval index i to a value of "K+1 (=6)" and the retrieval end value h to a value of "N (=K+K')" (step S207). The CPU 114 further determines whether or not the hold process is being carried out in the current injection molding cycle (step S208). If the hold process is being carried out, then the CPU 114 sets a flag F2 to a value of "1" (step S209), terminating the acceptance/rejection judgment processing for the present cycle.

At step 208 in a subsequent judgment processing cycle, if the PMCCPU 114 confirms that the hold process in the current injection molding cycle has been finished (data sampling for the injection and hold process (hereinafter referred to as the injection process) in the injection molding cycle concerned has been finished), then the PMCCPU 114 determines whether or not the value of the flag F2 is "1" which indicates that the acceptance/rejection judgment for the latest injection process has not been executed as yet (step S210). If the value of the flag F2 is "1", then the CPU 114 resets the flag F2 to "0" which indicates that the judgment process is being executed, and also resets values f and g of a first and second integration counters to "0", these counters being operable to count the number of rejections at the first to K-th judgment points, and the number of rejections at the (K+1)-th to N-th judgment points (step S211). Next, the CPU 114 determines whether the counter value SC is "1" or not (step S212), and it starts the acceptance/rejection judgment process in the judgment mode determined by the result of the just-mentioned determination.

In the step 212, if the PMCCPU 114 finds that the counter value SC is "0", and the first judgment mode has been selected accordingly in which mode the conformity of a respective product is judged by evaluating the conformity of the actual injection process parameters at the first to K-th judgment points associated with screw positions, then the CPU 114 sets the retrieval index m to a value of "1" (step S213). Further, the CPU 114 reads an actual screw position Xm (X1 in this case) at the m-th-sampling point in the latest injection process, that has been finished, from the m-th address region of the screw position data RAM 109 indicated by the value of the index m. The CPU 114 also reads, from the file concerned, a reference value xi (here, the value of x1 associated with the first judgment point) of the screw position associated with the i-th judgment point indicated by the retrieval index i. Furthermore, the CPU 114 determines whether or not the screw position Xm agrees with the reference value xi by checking whether or not the sampling screw position Xm falls within a predetermined range which includes the reference value xi of the screw position. (step S214).

If the CPU 114 finds that the screw position Xm does not coincide with the reference value xi, then it increments the value of the retrieval index m (step S215), and reads the next sampled screw position (X2 in this case) according to the updated index value m. After that, when the screw position Xm which corresponds to the reference value xi is detected, the CPU 114 calculates the elapsed time period $(m-1)\cdot\tau$ after the start of injection, which corresponds to the screw position Xm, on the basis of an index value m and a sampling cycle $\tau$ at the time point of said detection. The CPU 114 also reads, from the file concerned, a reference value ti of the elapsed time period and upper and lower limit values tli and tui of the time period deviation for the i-th judgment point i, and calculates the upper and lower limit values (ti+tui) and (ti−tli) of the elapsed time period on the basis of the thus read parameters. Whereupon, the CPU 114 determines whether or not the elapsed time period $(m-1)\cdot\tau$ falls within the permissible range (step S216), and increments the first integration counter value f if the elapsed time period is determined as falling outside the permissible range (step S217). Thus, the number of judgment points that have been rejected with respect to the elapsed time period is counted accumulatively.

Next, the PMCCPU 114 reads an injection pressure Pm from the m-th address region, corresponding to the index value m, of the pressure data RAM 108, and calculates the upper and lower limit values (pi+pui) and (pi−pli) of the injection pressure on the basis of the reference value pi of the injection pressure and the upper and lower limit values pli and pui of the pressure deviation for the i-th judgment point i that has been read from the file concerned. The CPU 114 further determines whether the injection pressure Pm falls within the permissible range (step S218). If not so, the CPU 114 increments the second integration counter value g (step S219). Thus, the number of the judgment points that have been rejected with respect to the injection pressure is counted accumulatively.

After incrementing the value of the retrieval index i (step S220), the CPU 114 determines whether the updated index value i (2 in this case) exceeds the retrieval end value h (=K) or not (step S221). If the index value i does not exceed the retrieval end value h, then the program goes back to the step S212. After that, the CPU 114 repeats the steps S212 to S221, so as to successively find unconformity of the elapsed time periods and injection pressures at the second to K-th judgment points.

At step S221 in a later processing cycle, when the CPU 114 determines that the retrieval index i has reached the retrieval end value h (=K), and hence the judgment for all of the first to K-th points has been completed, the CPU 114 further determines whether or not the first integration counter value f, indicative of the number of rejections associated with the elapsed time period, exceeds a permissible value C1, and at the same time the second integration counter value g, indicative of the number of rejections associated with the injection pressure, exceeds a permissible value C2 (step S222). If both the integration counter values exceed their permissible values, then the CPU 114 outputs a rejection signal which indicates that the product manufactured in the present injection molding cycle is defective (step S223). Otherwise, the CPU 114 outputs a nondefective product signal to show that the product is nondefective (step S224).

In short, in the case of the product conformity judgment executed by evaluating actual values of the injection process parameters at the first to K-th judgment points associated with the screw position, a common address m specifying that memory area in which a screw position indicative of the respective judgment point i (=1 to K) is stored is determined by retrieving stored contents of the screw position data RAM 109. Then, a judgment is made as to whether or not a value of $(m-1)\cdot\tau$, which is specified by the common address m and which represents an actual elapsed time period, at the judgment point i, from the start of injection, exceeds the permissible elapsed time range at the judgment point i. A further judgment is made as to whether or not a value of Pm, stored in that memory area of the pressure data RAM 108 which is specified by the common address m, and indicative of the actual injection pressure at the judgment point i, falls within the permissible injection pressure range at the judgment point i. Whereupon, the number of judgment points that have been rejected with respect to the elapsed time period and the number of judgment points that have been rejected with respect to the injection pressure are counted separately, and a product is determined as being unacceptable only when both the count values exceed their permissible values.

At step S212 of FIG. 4, if the counter value SC associated with the judgment mode selector key is determined as being "1" which indicates that the product conformity judgment should be made in the second judgment mode, then the PMCCPU 114 reads, from the concerned file of the shared RAM 105, the reference value ti of the elapsed time period from the moment injection is started, which has been set for the i-th judgment point corresponding to a value of the retrieval index i, so as to evaluate actual values of the injection process parameters at the (K+1)-th to N-th judgment points which are associated with the elapsed time period from the injection start. Next, the CPU 114 adds "1" to a value obtained by dividing the reference value ti by the sampling cycle $\tau$, to thereby calculate a value m indicative of the common address m which corresponds to the reference value ti (step S225). Whereupon, the CPU 114 reads a screw position Xm, corresponding to the reference value ti of the elapsed time period, from that address region m of the screw position data RAM 109 which is specified by the calculated value m, and also calculates upper and lower limit values (xi+xui) and (xi−xli) of the screw position at the i-th judgment point, on the basis of the reference value xi of the screw position and the upper and lower limit values xui and xli of the position deviation at the i-th judgment point. A further determination is made as to whether a sampled screw position Xm falls within the permissible range (step S226), and if the screw position Xm is out of the permissible range, then a value f of the second integration counter is incremented (step S217), whereby the number of judgment points that have been rejected with respect to the screw position is accumulatively counted.

Next, the PMCCPU 114 determines whether the sampled value Pm of the injection pressure which corresponds to the value of the common address m calculated at step S225 is acceptable or not, with the second integration counter value g incremented where required, and then increments the value of the retrieval index i (steps S218 through S220). The CPU 114 further determines whether the thus updated new index value i exceeds the retrieval end value h (=N) or not (step S221), and if the index value i does not exceed the retrieval end value h, then the step S212 is entered again. Thereafter, the PMCCPU 114 successively executes the unconformity judgment on the actual screw position and actual injection pressure for the (K+2)-th to N-th judgment points, and stores the numbers of rejections in the first and second integration counters.

At step S221 in a later processing cycle, when the CPU 114 determines that the retrieval index i has reached the retrieval end value h (=N), and hence the unconformity judgment on the screw position and injection pressure for all of the (K+1)-th to N-th judgment points has been completed, the CPU 114 further determines whether or not the first integration counter value f, indicative of the number of rejections associated with the screw position, exceeds a permissible value C1, and at the same time the second integration counter value g, indicative of the number of rejections associated with the injection pressure, exceeds a permissible value C2 (step S222). If both the integration counter values f and g exceed the permissible values, then the CPU 114 outputs a rejection signal indicating that the product is defective (step S223). Otherwise, the CPU 114 outputs a nondefective product signal to show that the product is nondefective (step S224).

In short, in the case of the product conformity judgment conducted by evaluating actual values of the injection process parameters at the (K+1)-th to N-th judgment points associated with the elapsed time period from the start of injection, a common address m which corresponds to the reference value ti of the elapsed time period set for the respective judgment point i (=K+1 to N) is determined on the basis of this elapsed time period reference value ti and the sampling cycle $\tau$. Whereupon, a judgment is made as to whether or not an actual screw position Xm and an actual injection pressure Pm at the judgment point i, which are specified by the common address m, fall within the permissible position range and permissible pressure range for the judgment point i, respectively. The number of judgment points that have been rejected with respect to the screw position and the number of judgment points that have been rejected with respect to the injection pressure are counted separately, and a product is determined as being unacceptable only when both the count values exceed their permissible values.

The present invention is not limited to the foregoing embodiment, and various modifications thereof may be made.

For instance, in the foregoing embodiment, the product acceptance/rejection judgment is executed by selectively carrying out either one of the conformity evaluation on the actual injection pressure and actual elapsed time period at those screw positions which are selected as judgment points, and the conformity evaluation on the actual injection pressure and actual screw positions at those elapsed time periods from the injection start which are selected as judgment points. Alternatively, both the two conformity evaluations may be made for the product conformity judgment.

In this case, it is arranged, for instance, that the counter value SC assumes "0" indicative of a first judgment mode, "1" indicative of a second judgment mode, or "2" indicative of a third mode which corresponds to a combination of the former two modes, in response to an operation of a judgment mode selector key. Further, a new judgment step for determining whether the current count value SC is "1" or "2" is provided between the step S205 and the step S207 shown in FIG. 4. When it is determined that the count value SC is "1," the step S207 is entered, while the retrieval index i and the retrieval end value h are respectively set to "1" and "N" when it is determined that the count value SC is "2." Upon completion of the steps S208 to S211, a determination is made as to whether the index value "i" is larger than the value "K," instead of the determination at the step S212 for determining whether the count value SC is "1" or not. Whereupon, if the index value "i" is determined as being less than the value "K," then the step S213 is entered so as to check the conformity of the actual elapsed time periods and actual injection pressures at the first to K-th judgment points. On the other hand, if the index value "i" is determined as being larger than the value "K," then the conformity of the actual screw positions and actual injection pressures at the (K+1)-th to N-th judgment points is determined. In this modification, the first integration counter counts both the rejections on elapsed time period and the rejections on screw position, and therefore, the permissible value C1 for the counter value f is set to a value larger than the permissible value C1 in the above-mentioned embodiment.

We claim:

1. A product acceptance/rejection judgment method in an injection molding machine, comprising the steps of:
   (a) displaying a group of pressure curves, which respectively represents, as a function of a predetermined parameter, changes in pressure during a plurality of injection processes in nondefective product molding;
   (b) selecting at least one value of the predetermined parameter;
   (c) setting a permissible pressure range, corresponding to the selected parameter value, based on the group of pressure curves;
   (d) effecting a judgment as to whether or not an actual pressure, generated when the predetermined parameter reaches the parameter value during one actual injection process, falls within the permissible pressure range; and
   (e) effecting a determination as to whether a product is acceptable or not in dependence on results of the judgment effected in said step (d).

2. A product acceptance/rejection judgment method according to claim 1, wherein said method is applied to an injection molding machine provided with an injection screw, and wherein said predetermined parameter is a position of the screw.

3. A product acceptance/rejection judgment method according to claim 1, wherein said predetermined parameter is a time period elapsed from an instant at which an injection process starts.

4. A product acceptance/rejection judgment method according to claim 1, wherein a plurality of values of the predetermined parameter are selected in said step (b), permissible pressure ranges respectively corresponding to the plurality of parameter values are set in said step (c) in a manner separately and independently from one another, and a judgment is made in said step (d) as to whether or not an actual pressure, generated when the predetermined parameter reaches each of the selected parameter values during the actual injection process, falls within the permissible pressure range corresponding to the parameter value concerned.

5. A product acceptance/rejection judgment method according to claim 4, wherein a counting operation is made in said step (d) each time the actual pressure, generated when the predetermined parameter reaches each of the selected parameter values, is determined as falling within the corresponding permissible pressure range, and the determination of said step (e) is made in dependence on a total count obtained in said step (d).

6. A product acceptance/rejection judgment method according to claim 4, wherein a counting operation is made in said step (d) each time the actual pressure, generated when the predetermined parameter reaches each of the selected parameter values, is determined as falling outside the corresponding permissible pressure range, and the determination of said step (e) is made in dependence on a total count obtained in said step (d).

7. A product acceptance/rejection judgment method according to claim 1, wherein said group of pressure curves is displayed on a graphic display.

8. A product acceptance/rejection judgment method according to claim 7, wherein said group of pressure curves is displayed on a two-dimensional orthogonal coordinate system provided on the graphic display.

9. A product acceptance/rejection judgment method according to claim 7, wherein the selection of each parameter value in said step (b) and the setting of each permissible pressure range in said step (c) are made on the graphic display.

10. A product acceptance/rejection judgment method in an injection molding machine, comprising the steps of:
   (a) displaying a first group of pressure curves, which respectively represents, as a function of a first predetermined parameter, pressure changes during a plurality of injection processes in nondefective product molding;
   (b) displaying, separately from the first group of pressure curves, a second group of pressure curves, which respectively represents, as a function of a second predetermined parameter, pressure changes during the plurality of injection processes in the nondefective product molding;
   (c) selecting at least one value of one of the first and second predetermined parameters;
   (d) setting a permissible pressure range corresponding to the selected parameter value in accordance with that pressure curve group among the first and second groups of pressure curves which is represented as the function of said one predetermined parameter;
   (e) setting a permissible pressure range for the other predetermined parameter, which range corresponds to the selected parameter value, in accordance with the pressure curve group among the first and second groups of pressure curves which is represented as the function of the other predetermined parameter;
   (f) effecting judgment as to whether or not an actual pressure and a value of the other parameter, respectively generated when the one predetermined parameter reaches the selected parameter value during one actual injection process, fall within the permissible pressure range and the permissible parameter range, respectively; and (g) effecting a determination as to whether a product is acceptable or not in dependence on results of the judgment effected in said step (f).

11. A product acceptance/rejection judgment method according to claim 10, wherein said method is applied to an injection molding machine provided with an injecting screw, and wherein the first parameter is a position of the screw and the second parameter is a time period elapsed from an instant at which an injection process starts.

12. A product acceptance/rejection judgment method according to claim 10, wherein a plurality of values of the one predetermined parameter are selected in said step (c), permissible pressure ranges respectively corresponding to the plurality of parameter values are set in said step (d) in a manner separately and independently from one another, and permissible parameter ranges respectively corresponding to the plurality of parameter values are set in said step (e) in a manner separately and independently from one another.

13. A product acceptance/rejection judgment method according to claim 10, wherein the first and second groups of pressure curves are respectively displayed on first and second two-dimensional orthogonal coordinate systems which are provided independently from each other on a graphic display.

14. A product acceptance/rejection judgment method according to claim 13, wherein the selection of each parameter value in said step (c), the setting of each permissible pressure range in said step (d), and the setting of each permissible parameter range in said step (e) are conducted on the graphic display.

15. A product acceptance/rejection judgment method according to claim 12, wherein counting is made in said step (f) each time the actual pressure and the value of the other parameter, respectively generated when the one predetermined parameter reaches each of the parameter values, are respectively determined as falling within the corresponding permissible pressure range the said corresponding permissible parameter range, and the determination of said step (g) is made in dependence on a total count obtained in said step (f).

16. A product acceptance/rejection judgment method according to claim 12, wherein counting is made in said step (f) each time the actual pressure and the value of the other parameter, respectively generated when the one predetermined parameter reaches each of the parameter values, are respectively determined as falling outside the corresponding permissible pressure range and the corresponding permissible parameter range, and the determination of said step (g) is made in dependence on a total count obtained in said step (f).

* * * * *